United States Patent
Zhang et al.

(10) Patent No.: US 11,861,612 B2
(45) Date of Patent: Jan. 2, 2024

(54) BLOCKCHAIN-BASED OFFLINE RESOURCE TRANSFER METHOD AND APPARATUS

(71) Applicant: Alipay (Hangzhou) Information Technology Co., Ltd., Zhejiang (CN)

(72) Inventors: Hong Zhang, Zhejiang (CN); Qi Huang, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/353,536

(22) Filed: Jun. 21, 2021

(65) Prior Publication Data

US 2022/0036354 A1    Feb. 3, 2022

(30) Foreign Application Priority Data

Jul. 31, 2020    (CN) .......................... 202010757515.1

(51) Int. Cl.
*G06Q 20/40*    (2012.01)
*G06F 16/27*    (2019.01)
(Continued)

(52) U.S. Cl.
CPC ........... *G06Q 20/401* (2013.01); *G06F 16/27* (2019.01); *G06Q 20/3278* (2013.01);
(Continued)

(58) Field of Classification Search
CPC .... G06Q 20/401; G06Q 20/3278; H04W 4/80
See application file for complete search history.

(56) References Cited

U.S. PATENT DOCUMENTS

| | | | |
|---|---|---|---|
| 10,049,349 B1 * | 8/2018 | Grassadonia | G06Q 20/40 |
| 2016/0248809 A1 * | 8/2016 | Smith | H04L 63/20 |

(Continued)

FOREIGN PATENT DOCUMENTS

| | | |
|---|---|---|
| CN | 108389129 A | 8/2018 |
| CN | 108764868 A | 11/2018 |
| CN | 110458542 A | 11/2019 |

*Primary Examiner* — Patrick McAtee
*Assistant Examiner* — Sima Asgari
(74) *Attorney, Agent, or Firm* — Seed IP Law Group LLP

(57) ABSTRACT

The present specification provides a blockchain-based offline resource transfer method and apparatus. A transferor terminal and a receiver terminal of offline resource transfer include multiple execution environments. Multiple computing nodes constructed based on the execution environments further constitute an offline blockchain network as blockchain nodes. The method includes: constructing an offline resource transfer transaction in response to an offline resource transfer operation initiated by a user on the transferor terminal; sending the offline resource transfer transaction to the receiver terminal through a short-range wireless communication between the transferor terminal and the receiver terminal, for the offline resource transfer transaction to be broadcast to the multiple computing nodes included in the offline blockchain network; and after consensus on the offline resource transfer transaction has been successfully completed by the offline blockchain network succeeds, executing the offline resource transfer transaction to transfer a resource corresponding to a resource transfer quantity from a transferor account to a receiver account.

17 Claims, 3 Drawing Sheets

(51) Int. Cl.
*G06Q 20/32* (2012.01)
*G06Q 20/36* (2012.01)
*G06Q 20/38* (2012.01)

(52) U.S. Cl.
CPC ......... *G06Q 20/36* (2013.01); *G06Q 20/3825* (2013.01); *G06Q 2220/00* (2013.01)

(56) References Cited

U.S. PATENT DOCUMENTS

| | | | |
|---|---|---|---|
| 2016/0253651 A1* | 9/2016 | Park | G06Q 20/322 705/39 |
| 2018/0276663 A1* | 9/2018 | Arora | G06K 7/1417 |
| 2019/0095907 A1* | 3/2019 | Govindarajan | H04L 9/12 |
| 2019/0130386 A1* | 5/2019 | Bhat | G06Q 20/322 |
| 2019/0349185 A1* | 11/2019 | Kim | H04L 9/0637 |
| 2020/0322129 A1* | 10/2020 | Wei | G06F 21/53 |
| 2021/0012331 A1* | 1/2021 | Higgins | H04L 9/0897 |
| 2021/0050989 A1* | 2/2021 | Kempf | H04L 9/0618 |

* cited by examiner

BLOCKCHAIN-BASED OFFLINE RESOURCE TRANSFER METHOD AND APPARATUS

BACKGROUND

Technical Field

One or more implementations of the present specification relate to the network communications field, and in particular, to blockchain-based offline resource transfer method and apparatus.

Description of the Related Art

A mobile terminal (such as a mobile phone, a tablet computer, or a wearable device) can perform offline transfer between user accounts by relying on an offline communication capability (such as NFC, Bluetooth, WiFi, or a quick response code) on the premise of being disconnected from the Internet. Due to a security requirement, an offline resource transfer transaction is usually protected by relying on a hardware security capability. For example, the offline resource transfer transaction is signed by using a trusted execution environment (TEE) or an SE in a mobile terminal device, to ensure that transaction data cannot be tampered with. However, due to the rigor of a financial transaction, the TEE is still considered to have security problems such as side channels/side-channel attacks in some scenarios. In addition, even though improved in security, the SE may still have vulnerabilities in specific use and therefore may fail by being attacked by hackers.

BRIEF SUMMARY

One or more implementations of the present specification provide a blockchain-based offline resource transfer method, where a transferor terminal and a receiver terminal of offline resource transfer include multiple execution environments, an offline blockchain network includes multiple computing nodes constructed based on the execution environments of the transferor terminal and the receiver terminal as blockchain nodes, and the method is applied to the transferor terminal, the method including: constructing an offline resource transfer transaction in response to an offline resource transfer operation initiated by a user on the transferor terminal, the offline resource transfer transaction including identification information of a transferor account, identification information of a receiver account, and a resource transfer quantity; sending the offline resource transfer transaction to the receiver terminal through a short-range wireless communication between the transferor terminal and the receiver terminal, for the offline resource transfer transaction to be broadcast to the multiple computing nodes included in the offline blockchain network; and after consensus on the offline resource transfer transaction has been successfully completed by the offline blockchain network based on a predetermined consensus mechanism succeeds, executing the offline resource transfer transaction to transfer a resource corresponding to the resource transfer quantity from the transferor account to the receiver account.

In an illustrative implementation, the computing nodes included in the offline blockchain network maintain initial resource quantities held by the receiver account and the transferor account of the offline resource transfer; and the executing the offline resource transfer transaction to transfer the resource corresponding to the resource transfer quantity from the transferor account to the receiver account includes: executing the offline resource transfer transaction to subtract the resource transfer quantity from a maintained initial resource quantity of the transferor account and add the resource transfer quantity to a maintained initial resource quantity of the receiver account.

In an illustrative implementation, the multiple execution environments included in the transferor terminal and the receiver terminal include one or more of a rich execution environment (REE), a trusted execution environment (TEE), or an execution element based on secure element (SE).

In an illustrative implementation, the short-range wireless communication includes one or more of an NFC communication, a Bluetooth communication, a WiFi communication, or a code scanning communication.

In an illustrative implementation, the predetermined consensus mechanism includes a RAFT consensus mechanism.

In an illustrative implementation, the transferor account and the receiver account are accounts respectively opened by the transferor user and a receiver user on an online blockchain; or the transferor account and the receiver account are offline accounts opened by the transferor user and the receiver user on the offline blockchain and corresponding to accounts respectively opened by the transferor user and the receiver user on an online blockchain.

In an illustrative implementation, the method further includes: in response to the transferor terminal being in an online state, performing data synchronization with node devices in the online blockchain network, and updating resource quantities held by the accounts corresponding to the receiver account and the transferor account and maintained by the nodes in the online blockchain network based on the resource quantities held by the receiver account and the transferor account of the offline resource transfer and maintained by the computing nodes in the offline blockchain network.

In an illustrative implementation, the resource includes an electronic currency, and the resource transfer includes currency transfer.

One or more implementations of the present specification provide a blockchain-based offline resource transfer method, where a transferor terminal and a receiver terminal of offline resource transfer include multiple execution environments, an offline blockchain network includes multiple computing nodes constructed based on the execution environments of the transferor terminal and the receiver terminal as blockchain nodes, and the method is applied to the receiver terminal, the method including: obtaining, through a short-range wireless communication between the transferor terminal and the receiver terminal, an offline resource transfer transaction constructed by the transferor terminal, for the offline resource transfer transaction to be broadcast to the multiple computing nodes included in the offline blockchain network, the offline resource transfer transaction including identification information of a transferor account, identification information of a receiver account, and a resource transfer quantity; and after consensus on the offline resource transfer transaction has been successfully completed by the offline blockchain network based on a predetermined consensus mechanism succeeds, executing the offline resource transfer transaction to transfer a resource corresponding to the resource transfer quantity from the transferor account to the receiver account.

In an illustrative implementation, the computing nodes included in the offline blockchain network maintain initial resource quantities held by the receiver account and the transferor account of the offline resource transfer; and the executing the offline resource transfer transaction to transfer the resource corresponding to the resource transfer quantity from the transferor account to the receiver account includes: executing the offline resource transfer transaction to subtract the resource transfer quantity from a maintained initial resource quantity of the transferor account and add the resource transfer quantity to a maintained initial resource quantity of the receiver account.

In an illustrative implementation, the multiple execution environments included in the transferor terminal and the receiver terminal include one or more of a rich execution environment (REE), a trusted execution environment (TEE), or an execution element based on secure element (SE).

In an illustrative implementation, the short-range wireless communication includes one or more of an NFC communication, a Bluetooth communication, a WiFi communication, or a code scanning communication.

In an illustrative implementation, the predetermined consensus mechanism includes a RAFT consensus mechanism.

In an illustrative implementation, the transferor account and the receiver account are accounts respectively opened by the transferor user and a receiver user on an online blockchain; or the transferor account and the receiver account are offline accounts opened by the transferor user and the receiver user on the offline blockchain and corresponding to accounts respectively opened by the transferor user and the receiver user on an online blockchain.

In an illustrative implementation, the method further includes: when the receiver terminal is in an online state, performing data synchronization with node devices in the online blockchain network, and updating resource quantities held by the accounts corresponding to the receiver account and the transferor account and maintained by the nodes in the online blockchain network based on the resource quantities held by the receiver account and the transferor account of the offline resource transfer and maintained by the computing nodes in the offline blockchain network.

In an illustrative implementation, the resource includes an electronic currency, and the resource transfer includes currency transfer.

The present specification further provides a blockchain-based offline resource transfer apparatus, where a transferor terminal and a receiver terminal of offline resource transfer include multiple execution environments, an offline blockchain network includes multiple computing nodes constructed based on the execution environments of the transferor terminal and the receiver terminal as blockchain nodes, and the apparatus is applied to the transferor terminal, the apparatus including: a construction unit, configured to construct an offline resource transfer transaction in response to an offline resource transfer operation initiated by a user on the transferor terminal, the offline resource transfer transaction including identification information of a transferor account, identification information of a receiver account, and a resource transfer quantity; a sending unit, configured to send the offline resource transfer transaction to the receiver terminal through a short-range wireless communication between the transferor terminal and the receiver terminal, for the offline resource transfer transaction to be broadcast to the multiple computing nodes included in the offline blockchain network; and an execution unit, configured to: after consensus on the offline resource transfer transaction has been successfully completed by the offline blockchain network based on a predetermined consensus mechanism succeeds, execute the offline resource transfer transaction to transfer a resource corresponding to the resource transfer quantity from the transferor account to the receiver account.

In an illustrative implementation, the computing nodes included in the offline blockchain network maintain initial resource quantities held by the receiver account and the transferor account of the offline resource transfer; and the execution unit is further configured to: execute the offline resource transfer transaction to subtract the resource transfer quantity from a maintained initial resource quantity of the transferor account and add the resource transfer quantity to a maintained initial resource quantity of the receiver account.

In an illustrative implementation, the transferor account and the receiver account are accounts respectively opened by the transferor user and a receiver user on an online blockchain; or the transferor account and the receiver account are offline accounts opened by the transferor user and the receiver user on the offline blockchain and corresponding to accounts respectively opened by the transferor user and the receiver user on an online blockchain.

In an illustrative implementation, the apparatus further includes: an online updating unit, configured to: in response to the transferor terminal being in an online state, perform data synchronization with node devices in the online blockchain network, and update resource quantities held by the accounts corresponding to the receiver account and the transferor account and maintained by the nodes in the online blockchain network based on the resource quantities held by the receiver account and the transferor account of the offline resource transfer and maintained by the computing nodes in the offline blockchain network.

The present specification further provides a blockchain-based offline resource transfer apparatus, where a transferor terminal and a receiver terminal of offline resource transfer include multiple execution environments, an offline blockchain network includes multiple computing nodes constructed based on the execution environments of the transferor terminal and the receiver terminal as blockchain nodes, and the apparatus is applied to the receiver terminal, the apparatus including: an acquisition unit, configured to obtain, through a short-range wireless communication between the transferor terminal and the receiver terminal, an offline resource transfer transaction constructed by the transferor terminal, for the offline resource transfer transaction to be broadcast to the multiple computing nodes included in the offline blockchain network, the offline resource transfer transaction including identification information of a transferor account, identification information of a receiver account, and a resource transfer quantity; and an execution unit, configured to: after consensus on the offline resource transfer transaction has been successfully completed by the offline blockchain network based on a predetermined consensus mechanism succeeds, execute the offline resource transfer transaction to transfer a resource corresponding to the resource transfer quantity from the transferor account to the receiver account.

In an illustrative implementation, the computing nodes included in the offline blockchain network maintain initial resource quantities held by the receiver account and the transferor account of the offline resource transfer; and the execution unit is further configured to: execute the offline resource transfer transaction to subtract the resource transfer quantity from a maintained initial resource quantity of the transferor account and add the resource transfer quantity to a maintained initial resource quantity of the receiver account.

In an illustrative implementation, the transferor account and the receiver account are accounts respectively opened by the transferor user and a receiver user on an online blockchain; or the transferor account and the receiver account are offline accounts opened by the transferor user and the receiver user on the offline blockchain and corresponding to accounts respectively opened by the transferor user and the receiver user on an online blockchain.

In an illustrative implementation, the apparatus further includes: an online updating unit, configured to: when the receiver terminal is in an online state, perform data synchronization with node devices in the online blockchain network, and update resource quantities held by the accounts corresponding to the receiver account and the transferor account and maintained by the nodes in the online blockchain network based on the resource quantities held by the receiver account and the transferor account of the offline resource transfer and maintained by the computing nodes in the offline blockchain network.

The present specification further provides a computer device, including a memory and a processor. The memory stores a computer program that can be run by the processor. The processor executes the blockchain-based offline resource transfer method executed by the transferor terminal when running the computer program.

The present specification further provides a computer device, including a memory and a processor. The memory stores a computer program that can be run by the processor. The processor executes the blockchain-based offline resource transfer method executed by the receiver terminal when running the computer program.

According to the blockchain-based offline resource transfer method and apparatus and the computer device provided in the implementations of the present specification, the multiple computing nodes constructed based on the execution environments included in the transferor terminal and the receiver terminal further constitute the offline blockchain network as blockchain nodes, broadcast, verification, consensus, and execution are performed on the offline resource transfer transaction by using the short-range wireless communication method, and security and tamper-resistance of the offline resource transfer transaction are ensured by using the tamper-resistance mechanism of the blockchain.

DETAILED DESCRIPTION

Figure 1:
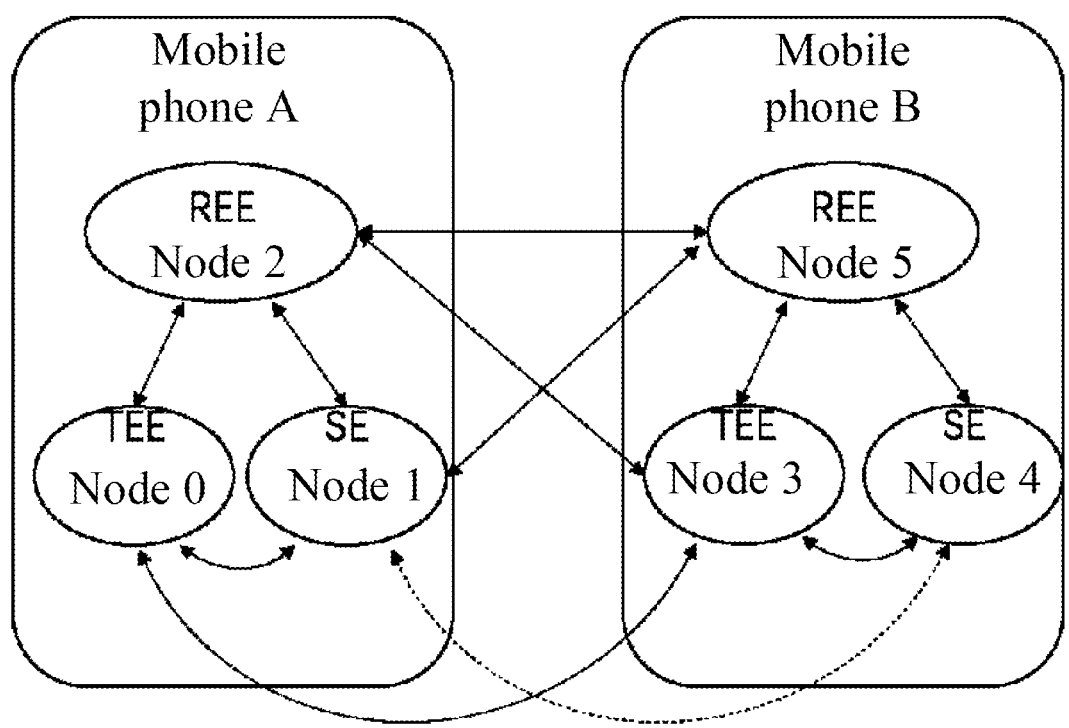
FIG. 1 is a schematic diagram illustrating an offline blockchain network constituted by multiple computing nodes constructed based on multiple execution environments in two mobile terminals according to an example implementation.

Example implementations are described in detail herein, and examples of the example implementations are presented in the accompanying drawings. When the following description relates to the accompanying drawings, the same number in different accompanying drawings represents the same element or similar elements unless specified otherwise. Implementations described in the following example implementations do not represent all implementations consistent with the one or more implementations of the present specification. On the contrary, they are only examples of apparatuses and methods described in the appended claims in detail and consistent with some aspects of the one or more implementations of the present specification.

It should be noted that, in other implementations, the steps of the corresponding method are not necessarily performed based on a sequence shown and described in the present specification. In some other implementations, the method can include more or fewer steps than the steps described in the present specification. In addition, a single step described in the present specification may be divided into multiple steps for description in other implementations, and multiple steps described in the present specification may be combined into a single step for description in other implementations.

In actual applications, a user often encounters an offline transfer requirement. For example, a mobile terminal (such as a mobile phone, a tablet computer, or a wearable device) can perform offline transfer between user accounts by relying on an offline communication capability (such as NFC, Bluetooth, WiFi, or a quick response code) on the premise of being disconnected from the Internet. Due to a security requirement, an offline resource transfer transaction is usually protected by relying on a hardware security capability. For example, the offline resource transfer transaction is signed by using a trusted execution environment (TEE) or a secure element (SE) in a mobile terminal device, to ensure that transaction data cannot be tampered with. However, due to the rigor of a financial transaction, the TEE is still considered to have security problems such as side channels/side-channel attacks in some scenarios. In addition, even though improved in security, the SE may still have vulnerabilities in specific use and therefore may fail by being attacked by hackers.

One or more implementations of the present specification provide an offline resource transfer method applicable to, e.g., a mobile terminal. The method is applied to a resource transfer system including a transferor terminal and a receiver terminal shown in FIG. 1. Multiple execution environments are separately included in the transferor user terminal and the receiver user terminal. An offline blockchain network includes multiple computing nodes constructed based on the execution environments of the transferor terminal and the receiver terminal as blockchain nodes.

A specific type of the transferor terminal or the receiver terminal is not limited in the present specification. The transferor terminal or the receiver terminal can include a form of a mobile terminal or a non-mobile terminal, or can include a device terminal such as a POS machine for a collection function or a cash register for near field payment. The mobile terminal includes but is not limited to an intelligent terminal such as a mobile phone, a tablet computer, or a wearable device.

The execution environment in the one or more implementations of the present specification includes hardware components (including a processor, a memory, etc.) required for program execution, and operating systems and applications that run on the hardware components.

For example, a rich execution environment (REE) includes a rich operating system (Rich OS) running on a general-purpose embedded processor and a client application thereon. In the REE, security of sensitive data cannot be ensured although many security measures such as device access control, a device data encryption mechanism, an application runtime isolation mechanism, and permission-based access control are used.

A trusted execution environment (TEE) is a security extension based on CPU hardware and completely isolated from the outside. The TEE is an independent running environment that runs outside the Rich OS. The TEE provides a security service to a common operating system and is isolated from the Rich OS, to ensure isolation execution, integrity of a trusted application, confidentiality of trusted data, secure storage, etc. The TEE was originally proposed by the Global Platform. The TEE is used to resolve secure isolation between resources in mobile devices, and is parallel to an operating system to provide a trusted secure execution environment for an application. The Trust Zone technology of ARM first implements a really commercial TEE technology.

With the rapid development of the Internet, a security requirement is increasingly high. In addition to the mobile device, a cloud device and a data center also propose more requirements for the TEE. The concept of TEE has also been developed and expanded at a high speed. The TEE now is a more general TEE than the concept originally proposed. For example, server chip manufacturers such as Intel and AMD successively introduce a hardware-assisted TEE, which enriches the concept and features of the TEE and is widely recognized in the industry. The TEE now usually refers to this type of hardware-assisted TEE technology. In addition, only secure resource isolation cannot meet the security requirement, and further data privacy protection is also proposed. Commercial TEEs, including Intel SGX and AMD SEV, each also provide a memory encryption technology to confine trusted hardware inside a CPU. Both bus and memory data are ciphertext to prevent a malicious user from snooping. For example, TEE technologies such as Intel software protection extension (SGX) isolate code execution, remote attestation, security configuration, secure data storage, and a trusted path for executing code. The application running in the TEE is protected in security and is difficult to be accessed by a third party.

Internal APIs of the TEE mainly include key management, a password algorithm, secure storage, and a secure clock resource and service, and can further include APIs such as an extended trusted UI. The trusted UI means that when crucial information is displayed and user crucial data (for example, a password) is entered, hardware resources such as screen display and a keyboard can be controlled and accessed by the TEE and cannot be accessed by software in the Rich OS. The internal API is a trusted application programming interface provided by the TEE. An external API of the TEE is an underlying communications interface that allows a client application (CA) running in the Rich OS to access trusted application services and data.

A secure element (SE) provides a processor element completely isolated from a general-purpose embedded processor, a storage element, and an operating system with relatively low complexity, and can be configured to store a key with a higher confidentiality level and perform a corresponding key operation. Although the SE externally provides an extremely limited interface and function, such as slow serial port connection, a low-performance CPU, inefficiency in processing a large amount of data, and a low UI capability, the SE has relatively high security.

Therefore, the TEE is a framework running in a terminal device and providing security higher than security provided by the REE and lower than security provided by the SE, and balances costs and ease of development. However, the TEE is still considered to have security problems such as side channels/side-channel attacks in some scenarios. In addition, even though improved in security, the SE may still have vulnerabilities in specific use and therefore may fail by being attacked by hackers. Therefore, it is difficult to ensure security of a financial transaction by relying on any one of execution environments such as the REE, the TEE, or the SE alone.

In the one or more implementations provided in the present specification, based on any execution environment included in the transferor terminal or the receiver terminal, a computing node (as shown in FIG. 1, a computing node is constructed in each of a REE, a TEE, or an SE of each terminal) serving as an offline blockchain node can be constructed, or multiple computing nodes serving as offline blockchain nodes can be constructed. It is not limited. The multiple computing nodes constructed based on the execution environment included in the transferor terminal and the receiver terminal participate in an offline resource transfer process as offline blockchain nodes.

The blockchain or blockchain network in the present specification can be specifically a P2P network system having a distributed data storage structure and obtained by nodes by using a consensus mechanism. Ledger data in the blockchain is distributed in "blocks (block)" connected in time. The current block can include a data digest of the previous block, and full data backup of all or some of the nodes is achieved based on different specific consensus mechanisms (for example, POW, POS, DPOS, or PBFT).

Real data generated in the physical world can be constructed into a standard transaction (transaction) format supported by a blockchain, and then published to the blockchain. Nodes in the blockchain perform consensus processing on the received transaction, and after a consensus is reached, a node serving as a bookkeeping or mining node in the blockchain packages the transaction into a block, for persistent storage in the blockchain.

Regardless of which consensus algorithm is used in the blockchain, the bookkeeping or mining node can package the received transaction to generate a latest or a proposed block and send the generated latest or proposed block to the other nodes for consensus verification. After receiving the latest or proposed block, if the other nodes learn, through verification, that the latest or proposed block has no problem, the other nodes can add the latest or proposed block to the end of the original blockchain to complete a bookkeeping process of the blockchain. In the process of verifying the new block sent by the bookkeeping or mining node, the other nodes can also execute the transaction included in the block.

It should be noted that, each time a latest or proposed block is generated in the blockchain, after a transaction in the latest or proposed block is executed, a corresponding status of the executed transaction in the blockchain changes accordingly. For example, in a blockchain constructed based on an account model, an account status of an external account or a smart contract account usually also correspondingly changes with transaction execution.

For example, after an "offline resource transfer transaction" in a block is executed, balances of a transferor account and a receiver account (namely, field values of balance fields of the accounts) associated with the "offline resource transfer transaction" usually also change accordingly.

For example, a "smart contract invocation transaction" in a block is used to invoke a smart contract deployed on the blockchain, the smart contract is invoked in an EVM corresponding to a node device to execute the "smart contract invocation transaction," and a data status corresponding to the smart contract invocation transaction is updated based on an execution result.

In the blockchain or blockchain network, the nodes can communicate with each other by using an Internet protocol, to achieve the consensus process. The "offline blockchain" in the one or more implementations of the present specification is a blockchain that includes multiple computing nodes running in a transferor terminal and a receiver terminal. As shown in FIG. 1, multiple computing nodes 0, 1, 2, 3, 4, and 5 running in a transferor terminal and a receiver terminal constitute an offline blockchain network 10. Intra-terminal computing nodes (for example, nodes 0, 1, and 2, or nodes 3, 4, and 5) can be connected by using an internal communication method, and inter-terminal computing nodes (for example, nodes 0, 1, or 2 and nodes 3, 4, or 5) can be connected by using a short-range wireless communication method, or referred to as short-distance wireless communication, including NFC communication, Bluetooth communication, WiFi communication, and code scanning communication, to perform processes such as transaction broadcast, transaction verification, transaction consensus, and transaction execution in the offline blockchain.

The "resource transfer" in the one or more implementations of the present specification is resource transfer between accounts of a transferor user and a receiver user. The present specification is not limited by any specific form of the resource. For example, the resource can include various resource forms such as an electronic currency, a security, a virtual digital asset, and a blockchain token (token). The blockchain token (token) can also correspond to assets such as cash, a security, a coupon, and a real estate outside the blockchain. The resource transfer method in the present specification is applicable to any scenario in which resource transfer/circulation is required, such as inter-user transfer and payment. It is not specifically limited.

For an account in a blockchain, an account status of the account is usually maintained by using a structure. When a transaction in a block is executed, a status of an account associated with the transaction in the blockchain usually also changes.

Taking Ethereum as an example, a structure of an account usually includes fields such as a balance field, a nonce field, a code field, and a storage field.

The balance field is used to maintain the current account balance of the account.

The nonce field is used to maintain a quantity of transactions of the account, and is a counter used to ensure that each transaction can be processed only once, thereby effectively avoiding a replay attack.

The code field is used to maintain contract code of the account. In actual applications, the code field usually maintains only a hash value of the contract code. Therefore, the code field is also commonly referred to as a Codehash field.

The storage field is used to maintain storage content of the account (a default field value is null). For a contract account, independent storage space is usually allocated to store storage content of the contract account. The independent storage space is usually referred to as account storage of the contract account. The storage content of the contract account is usually stored in the independent storage space by being constructed as a data structure of a Merkle Patricia Trie (MPT) tree. The MPT tree constructed based on the storage content of the contract account is usually also referred to as a storage tree. The storage field usually maintains only a root node of the storage tree. Therefore, the storage field is usually also referred to as a StorageRoot field.

For an external account, field values of the code field and the storage field shown above are both null.

A type of the transferor user account or the receiver user account is not limited in the present specification. For example, the transferor user account or the receiver user account can be an external account or a contract account. Correspondingly, the offline resource transfer transaction can be an offline resource transfer transaction between external accounts, an offline resource transfer transaction between an external account and a contract account, or an offline resource transfer transaction between contract accounts. When the offline resource transfer transaction relates to a contract account, a type of the offline resource transfer transaction can be a smart contract invocation transaction.

Figure 2:
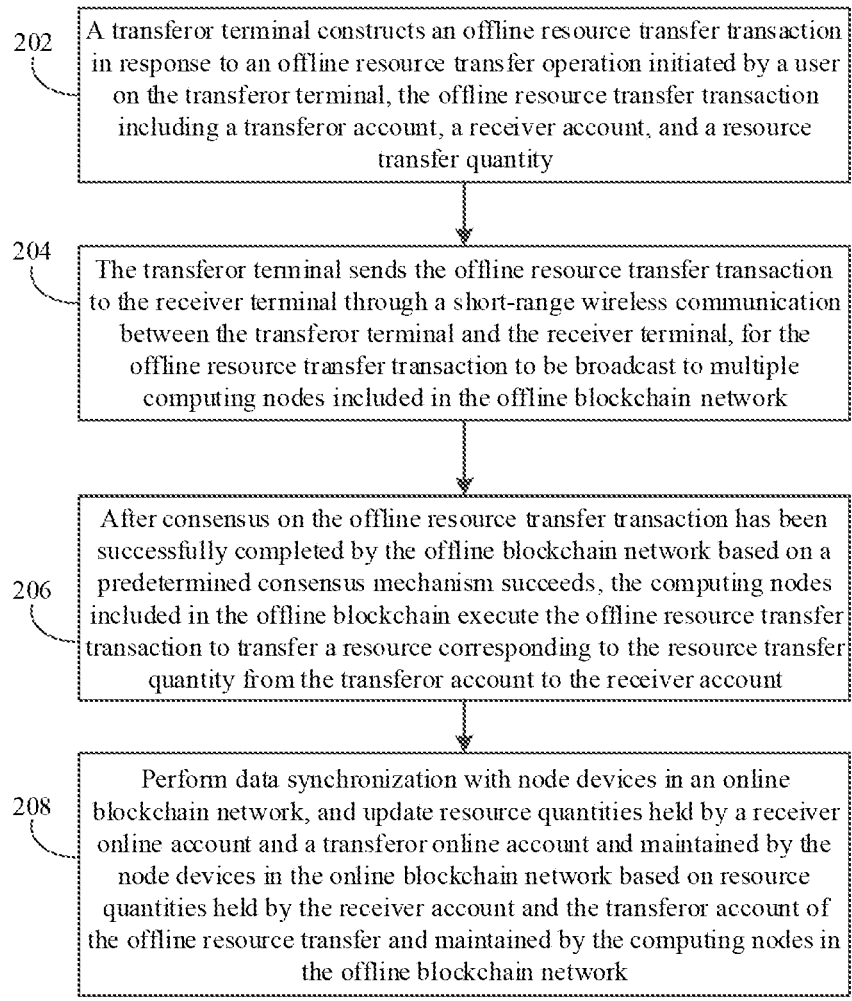
FIG. 2 is a schematic flowchart illustrating a blockchain-based offline resource transfer method according to an example implementation.

FIG. 2 illustrates a blockchain-based offline resource transfer method according to an example implementation of the present specification. The method includes the following steps.

Step 202: A transferor terminal constructs an offline resource transfer transaction in response to an offline resource transfer operation initiated by a user on the transferor terminal, the offline resource transfer transaction including a transferor account, a receiver account, and a resource transfer quantity.

For example, the user can trigger an "offline transfer" button on the transferor terminal to enter a construction interface of the offline resource transfer transaction. When constructing the offline resource transfer transaction, the transferor terminal usually needs to obtain receiver account information.

The present specification is not limited by any specific method in which the transferor terminal obtains the receiver account information. In an illustrative implementation, the transferor user can manually enter the receiver account information in the construction interface of the offline resource transfer transaction based on man-machine interaction with the transferor terminal. The manually entered receiver account information can be directly stored in any computing node included in the transferor terminal.

In an illustrative implementation, the transferor terminal can obtain the receiver account information by performing short-range wireless communication, for example, performing Bluetooth, WiFi, or NFC connection with a receiver terminal, or scanning a collection information graphic code provided by the receiver terminal. Collection information obtained through the short-range wireless communication can be directly stored in any computing node included in the transferor terminal.

The present specification is not limited by any specific type of an execution environment participating in the short-range wireless communication in the transferor terminal or the receiver terminal. For example, the execution environment can include a REE, a TEE, or an SE. Usually, REEs of the two terminals can be communicatively connected based on the short-range wireless communication method; or a TEE in one terminal can be connected to a REE or TEE in the other terminal based on the short-range wireless communication method. However, due to a relatively high security setting and a relatively low communication configuration of the SE, the SE is usually only used to be internally connected to a REE or TEE inside the terminal. However, the present specification is not limited to the connection method. For example, some SEs having a Bluetooth communication function can be connected to a REE or TEE in the other terminal based on the short-range wireless communication method.

A computing node obtaining the receiver account information and a computing node constructing the offline resource transfer transaction in the transferor terminal can be the same computing node in the same execution environment, or can be different computing nodes in the same execution environment, or can be different computing nodes in different execution environments included in the transferor terminal. It is not limited herein. For example, the computing node constructing the transaction can obtain the receiver account information stored in the other execution environment by using an internal communication method, and construct the offline resource transfer transaction based on the receiver account information.

In the implementations, content of the offline resource transfer transaction can include a transaction body and a digital signature. Transaction body content can include transferor account information, the receiver account information, and resource transfer quantity information. Based on different protocol types of an offline blockchain, the transaction body content can further include other content, such as an identifier of a to-be-transferred resource. When the offline blockchain is a blockchain constructed based on a bitcoin protocol, the transaction body can further include input and output of the current transaction. For example, to prevent the offline resource transfer transaction from being a double-spending transaction, the input may be unspent transaction output (UTXO).

In an illustrative implementation, the transferor terminal can construct the offline resource transfer transaction based on a wallet application client running in a first computing node. The wallet application can be developed specifically to execute the offline transfer in the present specification. A wallet account of the transferor user includes a resource specific to the offline transfer in the implementations of the present specification. For example, the wallet application is also applicable to online transfer. In this case, a part of a wallet balance of the transferor user can be loaded as an account balance of the offline blockchain, or some resources in a wallet of the transferor user can be loaded as a to-be-transferred resource quantity of the offline blockchain.

The first computing node of the transferor terminal can perform digital signature based on at least the transaction body content by using a private key or certificate of the transferor user. The private key or certificate of the transferor user can be stored in the first computing node, or can be stored in another computing node of the transferor terminal. To further ensure privacy security of a key to prevent a malicious party from stealing the key and impersonating the transferor user to construct an illegal offline resource transfer transaction, the private key or certificate of the transferor user can be stored in an execution environment having a relatively high security level and included in the transferor terminal, such as a TEE or an SE. Correspondingly, a computing node constructed in the execution environment storing the private key or certificate can receive the transaction body content sent by the first computing node, perform a digital signature operation based on the transaction body content, and return a digital signature generated through calculation to the first computing node. Both the key and the key operation are stored in the execution environment with the high security level, so that security of the key and the key operation is ensured.

Step 204: The transferor terminal sends the offline resource transfer transaction to the receiver terminal through a short-range wireless communication between the transferor terminal and the receiver terminal, for the offline resource transfer transaction to be broadcast to multiple computing nodes included in the offline blockchain network.

In an illustrative implementation, the first computing node of the transferor terminal sends the offline resource transfer transaction to a second computing node of the receiver terminal in response to the short-range wireless communication between the transferor terminal and the receiver terminal. The "sending" can include a method such as actively sending the offline resource transfer transaction or passively reading the offline resource transfer transaction. For example, the second computing node of the receiver terminal can obtain offline resource transfer transaction information by performing short-range wireless communication such as Bluetooth, WiFi or NFC connection, or code scanning identification, e.g., the receiver terminal scans a graphic code generated based on the offline resource transfer transaction information, to read the offline resource transfer transaction information, with the first computing node of the transferor terminal.

The present specification is not limited by any specific type of an execution environment in which the first computing node of the transferor terminal or the second computing node of the receiver terminal is located. For example, the execution environment can include a REE, a TEE, or an SE. Usually, REEs of the two terminals can be communicatively connected based on the short-range wireless communication method; or a TEE in one terminal can be connected to a REE or TEE in the other terminal based on the short-range wireless communication method. However, due to a relatively high security setting and a relatively low communication configuration of the SE, the SE is usually only used to be internally connected to a REE or TEE inside the terminal. Therefore, the SE can establish communication with a REE, a TEE, or an SE in the other terminal through transiting by the REE or TEE inside the terminal. However, the present specification is not limited to the connection method. For example, computing nodes constructed in some SEs having a Bluetooth communication function can be connected to a computing node constructed in a REE or TEE in the other terminal based on the short-range wireless communication method.

The implementations are not limited by any specific method of broadcasting the offline resource transfer transaction. For example, the first computing node and the second computing node can separately broadcast the offline resource transfer transaction in multiple computing nodes included in the transferor terminal and the receiver terminal by using an internal communication method, so that the multiple computing nodes can perform verification or consensus on the offline resource transfer transaction after obtaining the offline resource transfer transaction.

In some implementations, as shown in FIG. 1, the first computing node or the second computing node can still broadcast the offline resource transfer transaction in multiple computing nodes included in the receiver terminal or the transferor terminal by still using the short-range wireless communication method, so that the multiple computing nodes can perform verification or consensus on the offline resource transfer transaction after obtaining the offline resource transfer transaction.

In an illustrative implementation, to facilitate verification performed by multiple computing nodes included in the receiver terminal on the offline resource transfer transaction, the second computing node of the receiver terminal can obtain public key or certificate information of the transferor user by performing short-range wireless communication such as Bluetooth, WiFi, or NFC connection, or code scanning identification with the first computing node of the transferor terminal. For example, the receiver terminal scans a graphic code generated by the transferor terminal based on the offline resource transfer transaction information and the public key or certificate information of the transferor user. The second computing node broadcasts the obtained public key or certificate information of the transferor user and the offline resource transfer transaction information in the multiple computing nodes included in the receiver terminal, so that the multiple computing nodes can verify the offline resource transfer transaction based on the public key or certificate information of the transferor user.

In an illustrative implementation, to facilitate verification performed by multiple computing nodes included in the receiver terminal on the offline resource transfer transaction, the second computing node of the receiver terminal can exchange account information of the transferor user and a receiver user by performing short-range wireless communication such as Bluetooth, WiFi, or NFC connection, or code scanning identification with the first computing node of the transferor terminal. The account information of both users, the public key or certificate information of the transferor user, and the offline resource transfer transaction information are broadcast in the multiple computing nodes included in the transferor terminal and the receiver terminal, so that the multiple computing nodes can verify the offline resource transfer transaction based on the account information of the transferor user and the public key or certificate information of the transferor user. The multiple computing nodes included in the offline blockchain can execute the offline resource transfer transaction after verification and consensus performed by the multiple computing nodes included in the offline blockchain on the offline resource transfer transaction succeed.

Step 206: After consensus on the offline resource transfer transaction has been successfully completed by the offline blockchain network based on a predetermined consensus mechanism succeeds, the computing nodes included in the offline blockchain execute the offline resource transfer transaction to transfer a resource corresponding to the resource transfer quantity from the transferor account to the receiver account.

In an illustrative implementation, the offline blockchain network is constructed based on an Ethereum account model, and the computing nodes included in the offline blockchain network maintain initial resource quantities, e.g., account balances, held by the receiver account and the transferor account of the offline resource transfer.

A process in which the computing nodes included in the offline blockchain verify the offline resource transfer transaction includes but is not limited to one or more of verification steps such as verifying validity of the digital signature, verifying effectiveness of the resource transfer quantity, for example, verifying whether a balance of the transferor account is sufficient to pay a transfer amount, and verifying effectiveness of the to-be-transferred resource, for example, verifying whether the transferor account includes an untransferred valid to-be-transferred resource. It is not limited in this implementation.

The present specification is not limited by any consensus mechanism used by the computing nodes in the offline blockchain. In an illustrative implementation, to reduce a quantity of times of short-range wireless communication between the transferor terminal and the receiver terminal in a consensus phase, the offline blockchain can use a RAFT consensus mechanism.

In the RAFT consensus algorithm, a node can have three states: a leader node, a follower node, and a candidate node. The leader node is responsible for replicating a packaged log on which consensus is to be performed and distributing the log to the other nodes, and only one leader stores the log in the same round of consensus. The follower node receives the log on which consensus is to be performed sent by the leader and performs consensus on a block. The candidate node is an intermediate state of conversion from the follower to the leader. In the one or more implementations provided in the present specification, the log on which consensus is to be performed includes an offline resource transfer transaction on which consensus is to be performed.

The RAFT algorithm can be divided into the following steps.

Step 1: Leader (Leader node) election. For example, in an initial state, all nodes are started as follower roles, and an election timer is started simultaneously (time is random to reduce a collision probability). If a node finds that the node has not received a heartbeat request sent by a leader until the time of the election timer expires, the node becomes a candidate (Candidate) and remains in this state until one of the following three cases occurs: the node (Candidate) wins the election; another node(s) wins the election; and no server wins the election after a period of time (the next round (Term) of election is entered and the time of the election timer is randomly set).

Then, the candidate sends a request for vote (Request Vote) to the other nodes. If the candidate is approved of by more than half of the nodes, the candidate becomes a leader (Leader). If no leader is elected until the election expires, the next term is entered for re-election. After the leader election is completed, the leader periodically sends a heartbeat (Heartbeat) packet to the other nodes to tell the other nodes that the leader is still running, and resets election timers of these nodes.

Stage 2: Log replication (Log Replication).

The leader node can verify a command, for example, the offline resource transfer transaction in the present specification, after receiving the command based on short-range wireless communication, and append the command to the local log after the verification succeeds. In this case, the command is in an "uncommitted" state, and a replication state machine does not execute the command. Then, the leader concurrently replicates the command to the other nodes and waits for the other nodes to write the command to logs. If some nodes fail or are slow in this case, the leader node keeps reattempting until all the nodes save the command in logs. Then, the leader node submits a command execution instruction, for example, an instruction for executing the offline resource transfer transaction, and returns an execution result to a client constructing the command, for example, a wallet application constructing the offline resource transfer transaction. After the leader node submits the command execution instruction, a next heartbeat packet includes a message for notifying the other nodes to execute the command. After receiving the message from the leader, the other nodes apply the command to state machines (State Machine) to execute the command. Finally, the logs of all the nodes are consistent.

In the RAFT algorithm, for requests with inconsistent log content, log content of the follower node is overwritten with log content of the leader node. First, the first inconsistent places in the log records of the two nodes are identified, and then overwriting is performed until the latest submitted command position is overwritten.

In the one or more implementations provided in the present specification, based on the RAFT consensus mechanism, the multiple computing nodes included in the transferor terminal and the receiver terminal can store the offline resource transfer transaction on which the verification and consensus succeed in respectively locally stored offline blockchain databases; and based on execution of the offline resource transfer transaction, the resource corresponding to the resource transfer quantity is transferred from the transferor account to the receiver account, for example, the resource transfer quantity is subtracted from a maintained initial resource quantity (transferor account balance) held by the transferor account and the resource transfer quantity is added to a maintained initial resource quantity (receiver account balance) held by the receiver account.

In an illustrative implementation, the transferor account and the receiver account are accounts respectively opened by the transferor user and the receiver user on an online blockchain. The online blockchain network includes a blockchain network constructed based on a long-range communications protocol such as the Internet. To further facilitate online operations of the transferor account and the receiver account, the transferor terminal and the receiver terminal can serve as nodes or clients in the online blockchain.

For example, the transferor terminal and the receiver terminal respectively run wallet applications of the transferor user and the receiver user in the online blockchain, and the wallet applications respectively record identification information of accounts opened by the transferor user and the receiver user on the online blockchain and account content (for example, account balances). The wallet application in the online blockchain is also applicable to the offline blockchain in the present specification. For example, the online blockchain account identification information and the account content (for example, the account balances) of the transferor user and the receiver user can be directly applied to the offline blockchain transfer.

When the transferor terminal and the receiver terminal complete the offline resource transfer based on the resource transfer process in steps 202 to 206 and the transferor terminal and the receiver terminal are in an online state (for example, Internet communication is recovered), the transferor terminal or the receiver terminal can further perform step 208: Perform data synchronization with node devices in the online blockchain network, and update resource quantities held by a receiver online account and a transferor online account and maintained by the node devices in the online blockchain network based on the resource quantities held by the receiver account and the transferor account of the offline resource transfer and maintained by the computing nodes in the offline blockchain network.

For example, the online blockchain can directly approve of the offline resource transfer transaction stored in the offline blockchain, and update online account balances of the two users based on the offline resource transfer transaction.

In example implementations, when the transferor terminal and the receiver terminal are in an online state (for example, Internet communication is restored), the transferor terminal or the receiver terminal can send the offline resource transfer transaction recorded in the offline blockchain to the online blockchain, so that the offline resource transfer transaction is executed on the online blockchain after consensus verification performed by the online blockchain on the offline resource transfer transaction succeeds.

In an illustrative implementation, the transferor account and the receiver account are offline accounts opened by the transferor user and the receiver user on the offline blockchain and corresponding to accounts respectively opened by the transferor user and the receiver user on an online blockchain. To further facilitate online operations of the transferor account and the receiver account, the transferor terminal and the receiver terminal can serve as nodes or clients of the online blockchain.

For example, the transferor terminal and the receiver terminal respectively run wallet applications of the transferor user and the receiver user in the online blockchain, and the wallet applications respectively record online blockchain account identification information and account content (for example, account balances) of the transferor user and the receiver user. The wallet application in the online blockchain is also applicable to the offline blockchain in the present specification. For example, the transferor user or the receiver user can load some resources from an online blockchain account of the transferor user or the receiver user for the transfer process of the offline blockchain in steps 202 to 206.

When the transferor terminal and the receiver terminal complete the offline resource transfer based on the resource transfer process in steps 202 to 206 and the transferor terminal and the receiver terminal are in an online state (for example, Internet communication is recovered), the transferor terminal or the receiver terminal can further perform step 208: Perform data synchronization with node devices in the online blockchain network, and update total resource quantities (including online balances and offline balances) held by the receiver account and the transferor account and maintained by the node devices in the online blockchain network based on the resource quantities held by the receiver account and the transferor account of the offline resource transfer and maintained by the computing nodes in the offline blockchain network, that is, update online blockchain accounts of the two users based on the offline resource transfer transaction performed by the two terminals in an offline state.

According to the blockchain-based offline resource transfer method provided in the one or more implementations of the present specification, the offline resource transfer transaction can be stored in the offline blockchain constructed by the multiple computing nodes running in the transferor terminal and the receiver terminal, and the multiple computing nodes are respectively constructed based on the multiple execution environments included in the transferor terminal and the receiver terminal. Security of the offline resource transfer transaction is ensured based on the tamper-resistance mechanism of the blockchain. Therefore, difficulty in attacking and tampering with a ledger of each computing node by a hacker can be increased by constructing more computing nodes compared with performing the offline resource transfer transaction in a certain execution environment of the transferor terminal or the receiver terminal.

Corresponding to the above process implementation, an implementation of the present specification further provides resource transfer apparatuses 30 and 40. The apparatuses 30 and 40 can be implemented by using software, hardware, or a combination of software and hardware. Software implementation is used as an example. As a logical apparatus, the apparatus is formed by reading a corresponding computer program instruction to a memory for execution by using a central processing unit (CPU) of a device in which the apparatus is located. In terms of hardware, in addition to a CPU, a memory, and a storage shown in FIG. 5, the device in which the apparatus is located usually further includes other hardware such as a chip for wireless signal sending/ receiving, and/or other hardware such as a card for implementing a network communication function.

Figure 3:
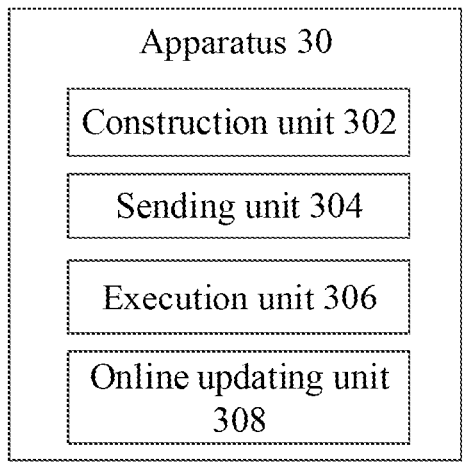
FIG. 3 is a schematic diagram illustrating a blockchain-based offline resource transfer apparatus applied to a transferor terminal according to an example implementation.

As shown in FIG. 3, the present specification provides a blockchain-based offline resource transfer apparatus 30. A transferor terminal and a receiver terminal of offline resource transfer include multiple execution environments. An offline blockchain network includes multiple computing nodes constructed based on the execution environments of the transferor terminal and the receiver terminal as blockchain nodes. The apparatus is applied to the transferor terminal, the apparatus including: a construction unit 302, configured to construct an offline resource transfer transaction in response to an offline resource transfer operation initiated by a user on the transferor terminal, the offline resource transfer transaction including identification information of a transferor account, identification information of a receiver account, and a resource transfer quantity; a sending unit 304, configured to send the offline resource transfer transaction to the receiver terminal through a short-range wireless communication between the transferor terminal and the receiver terminal, for the offline resource transfer transaction to be broadcast to the multiple computing nodes included in the offline blockchain network; and an execution unit 306, configured to: after consensus on the offline resource transfer transaction has been successfully completed by the offline blockchain network based on a predetermined consensus mechanism succeeds, execute the offline resource transfer transaction to transfer a resource corresponding to the resource transfer quantity from the transferor account to the receiver account.

In an illustrative implementation, the computing nodes included in the offline blockchain network maintain initial resource quantities held by the receiver account and the transferor account of the offline resource transfer; and the execution unit 306 is further configured to: execute the offline resource transfer transaction to subtract the resource transfer quantity from a maintained initial resource quantity of the transferor account and add the resource transfer quantity to a maintained initial resource quantity of the receiver account.

In an illustrative implementation, the transferor account and the receiver account are accounts respectively opened by the transferor user and a receiver user on an online blockchain; or the transferor account and the receiver account are offline accounts opened by the transferor user and the receiver user on the offline blockchain and corresponding to accounts respectively opened by the transferor user and the receiver user on an online blockchain.

In an illustrative implementation, the apparatus 30 further includes: an online updating unit 308, configured to: in response to the transferor terminal being in an online state, perform data synchronization with node devices in the online blockchain network, and update resource quantities held by the accounts corresponding to the receiver account and the transferor account and maintained by the nodes in the online blockchain network based on the resource quantities held by the receiver account and the transferor account of the offline resource transfer and maintained by the computing nodes in the offline blockchain network.

For a specific implementation process of the functions of the units in the apparatus 30, references can be made to the implementation process of the corresponding steps in the above resource transfer method executed by the transferor terminal. For related parts, references can be made to parts of the method implementation descriptions. Details are omitted herein for simplicity.

Figure 4:
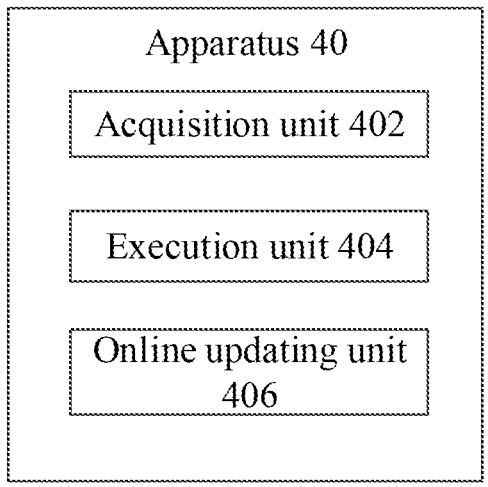
FIG. 4 is a schematic diagram illustrating a blockchain-based offline resource transfer apparatus applied to a receiver terminal according to an example implementation.

As shown in FIG. 4, the present specification further provides a blockchain-based offline resource transfer apparatus 40. A transferor terminal and a receiver terminal of offline resource transfer include multiple execution environments. An offline blockchain network includes multiple computing nodes constructed based on the execution environments of the transferor terminal and the receiver terminal as blockchain nodes. The apparatus 40 is applied to the receiver terminal and includes: an acquisition unit 402, configured to obtain, through a short-range wireless communication between the transferor terminal and the receiver terminal, an offline resource transfer transaction constructed by the transferor terminal, for the offline resource transfer transaction to be broadcast to the multiple computing nodes included in the offline blockchain network, the offline resource transfer transaction including identification information of a transferor account, identification information of a receiver account, and a resource transfer quantity; and an execution unit 404, configured to: after consensus on the offline resource transfer transaction has been successfully completed by the offline blockchain network based on a predetermined consensus mechanism succeeds, execute the offline resource transfer transaction to transfer a resource corresponding to the resource transfer quantity from the transferor account to the receiver account.

In an illustrative implementation, the computing nodes included in the offline blockchain network maintain initial resource quantities held by the receiver account and the transferor account of the offline resource transfer; and the execution unit 404 is further configured to: execute the offline resource transfer transaction to subtract the resource transfer quantity from a maintained initial resource quantity of the transferor account and add the resource transfer quantity to a maintained initial resource quantity of the receiver account.

In an illustrative implementation, the transferor account and the receiver account are accounts respectively opened by the transferor user and a receiver user on an online blockchain; or the transferor account and the receiver account are offline accounts opened by the transferor user and the receiver user on the offline blockchain and corresponding to accounts respectively opened by the transferor user and the receiver user on an online blockchain.

In an illustrative implementation, the apparatus further includes: an online updating unit 406, configured to: when the receiver terminal is in an online state, perform data synchronization with node devices in the online blockchain network, and update resource quantities held by the accounts corresponding to the receiver account and the transferor account and maintained by the nodes in the online blockchain network based on the resource quantities held by the receiver account and the transferor account of the offline resource transfer and maintained by the computing nodes in the offline blockchain network.

For a specific implementation process of the functions of the units in the apparatus 40, references can be made to the implementation process of the corresponding steps in the above resource transfer method executed by the receiver terminal. For related parts, references can be made to parts of the method implementation descriptions. Details are omitted herein for simplicity.

The described apparatus implementation is merely an example. The units described as separate parts may or may not be physically separate, and parts displayed as units may or may not be physical modules, that is, may be located in one position, or may be distributed on multiple network modules. Some or all of the units or modules can be selected based on actual requirements to achieve the objectives of the solutions of the present specification. A person of ordinary skill in the art can understand and implement the present specification without creative efforts.

The apparatus, unit, or module illustrated in the above implementations can be specifically implemented by using a computer chip or an entity, or can be implemented by using a product with a certain function. A typical implementation device is a computer, and a specific form of the computer can be a personal computer, a laptop computer, a cellular phone, a camera phone, a smartphone, a personal digital assistant, a media player, a navigation device, an e-mail sending/receiving device, a game console, a tablet computer, a wearable device, or any combination of several of these devices.

Figure 5:
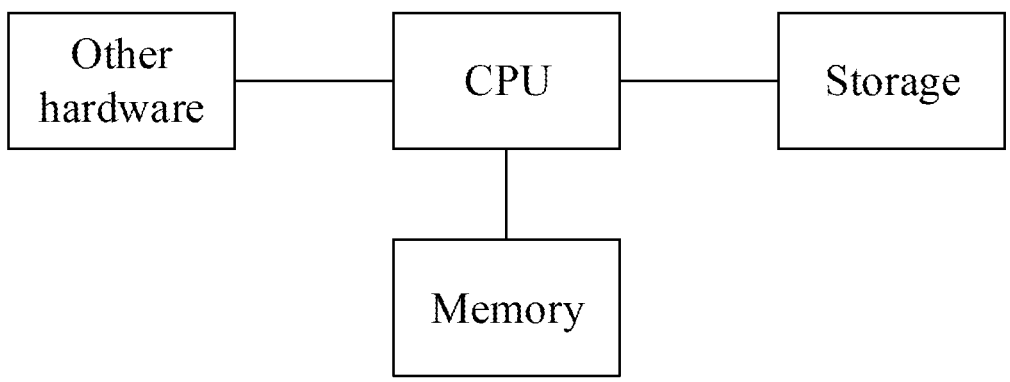
FIG. 5 is a hardware structural diagram illustrating an implementation of a blockchain-based offline resource transfer apparatus according to the present specification.

Corresponding to the above method implementation, an implementation of the present specification further provides a computer device. As shown in FIG. 5, the computer device includes a memory and a processor. The memory stores a computer program that can be run by the processor. The processor executes the steps of the blockchain-based offline resource transfer method executed by the transferor terminal in the implementations of the present specification when running the stored computer program. For detailed descriptions of the steps of the blockchain-based offline resource transfer method executed by the transferor terminal, references can be made to the above content. Details are not repeated.

Corresponding to the above method implementation, an implementation of the present specification further provides a computer device. As shown in FIG. 5, the computer device includes a memory and a processor. The memory stores a computer program that can be run by the processor. The processor executes the steps of the blockchain-based offline resource transfer method executed by the receiver terminal in the implementations of the present specification when running the stored computer program. For detailed descriptions of the steps of the blockchain-based offline resource transfer method executed by the receiver terminal, references can be made to the above content. Details are not repeated.

The above descriptions are merely example implementations of the present specification, but are not intended to limit the present specification. Any modification, equivalent replacement, improvement, etc., made without departing from the spirit and principle of the present specification shall fall within the protection scope of the present specification.

In a typical configuration, the computing device includes one or more processors (CPUs), input/output interfaces, network interfaces, and memories.

The memory may include a form such as a non-permanent memory, a random access memory (RAM), and/or a non-volatile memory in a computer readable medium, such as a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

An example of the computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disk (DVD) or another optical storage, a magnetic cassette tape, a magnetic tape magnetic disk storage or another magnetic storage device, or any other non-transmission medium. The computer storage medium can be configured to store information accessible to a computing device. As defined herein, the computer readable medium does not include transitory media (transitory media), such as a modulated data signal and a carrier.

It should be further noted that the term "comprise," "include," or their any other variant is intended to cover a non-exclusive inclusion, so that a process, method, commodity, or device that includes a series of elements not only includes those elements but also includes other elements that are not expressly listed, or further includes elements inherent to such process, method, commodity, or device. An element preceded by "includes a . . . " does not, without more constraints, preclude the presence of additional identical elements in the process, method, commodity, or device that includes the element.

A person skilled in the art should understand that the implementations of the present specification can be provided as a method, a system, or a computer program product. Therefore, the implementations of the present specification can use a form of hardware only implementations, software only implementations, or implementations with a combination of software and hardware. Moreover, the implementation of the present specification can use a form of a computer program product that is implemented on one or more computer-usable storage media (including but not limited to a magnetic disk memory, a CD-ROM, an optical memory, and the like) that include computer-usable program code.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A blockchain-based offline resource transfer method, comprising:
   deploying an offline blockchain network that includes a first plurality of blockchain nodes and a second plurality of blockchain nodes, wherein:
   the first plurality of blockchain nodes are implemented in a first plurality of execution environments different from one another in a transferor terminal, the first plurality of execution environments having different data security levels,
   the second plurality of blockchain nodes are implemented in a second plurality of execution environments different from one another in a receiver terminal, the second plurality of execution environments having different data security levels, the first plurality of blockchain nodes configured to communicate with one another through a first internal communication channel of the transferor terminal,
the second plurality of blockchain nodes configured to communicate with one another through a second internal communication channel of the receiver terminal,
the first plurality of blockchain nodes sharing a first security key that is stored in a first blockchain node of the first plurality of blockchain nodes, in a first execution environment of the first plurality of execution environments, having a highest data security level among the first plurality of execution environments,
the second plurality of blockchain nodes sharing a second security key that is stored in a first blockchain node of the second plurality of blockchain nodes, in a first execution environment of the second plurality of execution environments, having a highest data security level among the second plurality of execution environments,
a second blockchain node of the first plurality of blockchain nodes, in a second execution environment of the first plurality of execution environments, is designated for communication with a second blockchain node of the second plurality of blockchain nodes,
the second blockchain node of the second plurality of blockchain nodes, in a second execution environment of the second plurality of execution environments, is designated for communication with the second blockchain node of the first plurality of blockchain nodes,
each blockchain node of the first plurality of blockchain nodes and the second plurality of blockchain nodes are configured to perform consensus verification on a resource transfer transaction;
receiving, by a third blockchain node of the first plurality of blockchain nodes, from a user of the transferor terminal, a request for an offline resource transfer transaction, the request including identification information of a transferor account, identification information of a receiver account, and a resource transfer quantity;
receiving, by the third blockchain node of the first plurality of blockchain nodes, the first security key from the first blockchain node of the first plurality of blockchain nodes through the first internal communication channel;
constructing, by the third blockchain node of the first plurality of blockchain nodes, the offline resource transfer transaction based on the received request, the constructing including securing the offline resource transfer transaction using the first security key;
broadcasting, by the third blockchain node of the first plurality of blockchain nodes, the offline resource transfer transaction to blockchain nodes of the first plurality of blockchain nodes through the first internal communication channel;
sending, by the second blockchain node of the first plurality of blockchain nodes, the offline resource transfer transaction to the second blockchain node of the second plurality of blockchain nodes, through a short-range wireless communication between the transferor terminal and the receiver terminal;
broadcasting, by a blockchain node of the second plurality of blockchain nodes, the offline resource transfer transaction to blockchain nodes of the second plurality of blockchain nodes through the second internal communication channel;
performing consensus on the offline resource transfer transaction between the first plurality of blockchain nodes and the second plurality of blockchain nodes based on a consensus mechanism of the offline blockchain network;
executing the offline resource transfer transaction to transfer a resource corresponding to the resource transfer quantity from the transferor account to the receiver account.

2. The method according to claim 1, wherein blockchain nodes of the offline blockchain network each maintain initial resource quantities held by the receiver account and the transferor account of the offline resource transfer transaction, the executing the offline resource transfer transaction to transfer the resource corresponding to the resource transfer quantity from the transferor account to the receiver account includes:
subtracting the resource transfer quantity from a maintained initial resource quantity of the transferor account on each node and adding the resource transfer quantity to a maintained initial resource quantity of the receiver account of each node.

3. The method according to claim 1, wherein the first plurality of execution environments in the transferor terminal include one or more of a rich execution environment, a trusted execution environment, and an execution element based on a secure element.

4. The method according to claim 1, wherein the short-range wireless communication includes one or more of an NFC communication, a Bluetooth communication, a WiFi communication, or a code scanning communication.

5. The method according to claim 1, wherein the consensus mechanism includes a RAFT consensus mechanism.

6. The method according to claim 1, wherein the transferor account and the receiver account each is one of an account on an online blockchain network, or an offline account on the offline blockchain network corresponding to an account on an online blockchain network.

7. The method according to claim 6, further comprising:
in response to the transferor terminal being in an online state, performing data synchronization with nodes in an online blockchain network; and
updating resource quantities held by accounts corresponding to the receiver account and the transferor account and maintained by nodes in the online blockchain network based on resource quantities held by the receiver account and the transferor account of the offline resource transfer and maintained by blockchain nodes in the offline blockchain network.

8. The method according to claim 1, wherein the resource includes an electronic currency, and the resource transfer includes electronic currency transfer.

9. A non-transitory computer-readable medium having executable instructions stored thereon, the executable instructions, when executed by one or more processors, enabling the one or more processors to individually or collectively perform operations including:
deploying an offline blockchain network that includes a first plurality of blockchain nodes and a second plurality of blockchain nodes, wherein:
the first plurality of blockchain nodes are implemented in a first plurality of execution environments different from one another in a transferor terminal, the first plurality of execution environments having different data security levels,
the second plurality of blockchain nodes are implemented in a second plurality of execution environments different from one another in a receiver terminal, the second plurality of execution environments having different data security levels, the first plurality of blockchain nodes configured to communicate with one another through a first internal communication channel of the transferor terminal, the second plurality of blockchain nodes configured to communicate with one another through a second internal communication channel of the receiver terminal, the first plurality of blockchain nodes sharing a first security key that is stored in a first blockchain node of the first plurality of blockchain nodes, in a first execution environment of the first plurality of execution environments, having a highest data security level among the first plurality of execution environments, the second plurality of blockchain nodes sharing a second security key that is stored in a first blockchain node of the second plurality of blockchain nodes, in a first execution environment of the second plurality of execution environments, having a highest data security level among the second plurality of execution environments, a second blockchain node of the first plurality of blockchain nodes, in a second execution environment of the first plurality of execution environments, is designated for communication with a second blockchain node of the second plurality of blockchain nodes, the second blockchain node of the second plurality of blockchain nodes, in a second execution environment of the second plurality of execution environments, is designated for communication with the second blockchain node of the first plurality of blockchain nodes, each blockchain node of the first plurality of blockchain nodes and the second plurality of blockchain nodes are configured to perform consensus verification on a resource transfer transaction;

receiving, by a third blockchain node of the first plurality of blockchain nodes, from a user of the transferor terminal, a request for an offline resource transfer transaction, the request including identification information of a transferor account, identification information of a receiver account, and a resource transfer quantity;

receiving, by the third blockchain node of the first plurality of blockchain nodes, the first security key from the first blockchain node of the first plurality of blockchain nodes through the first internal communication channel;

constructing, by the third blockchain node of the first plurality of blockchain nodes, the offline resource transfer transaction based on the received request, the constructing including securing the offline resource transfer transaction using the first security key;

broadcasting, by the third blockchain node of the first plurality of blockchain nodes, the offline resource transfer transaction to blockchain nodes of the first plurality of blockchain nodes through the first internal communication channel;

sending, by the second blockchain node of the first plurality of blockchain nodes, the offline resource transfer transaction to the second blockchain node of the second plurality of blockchain nodes, through a short-range wireless communication between the transferor terminal and the receiver terminal;

broadcasting, by a blockchain node of the second plurality of blockchain nodes, the offline resource transfer transaction to blockchain nodes of the second plurality of blockchain nodes through the second internal communication channel;

performing consensus on the offline resource transfer transaction between the first plurality of blockchain nodes and the second plurality of blockchain nodes based on a consensus mechanism of the offline blockchain network;

executing the offline resource transfer transaction to transfer a resource corresponding to the resource transfer quantity from the transferor account to the receiver account.

10. The non-transitory computer-readable medium according to claim 9, wherein blockchain nodes of the offline blockchain network each maintain initial resource quantities held by the receiver account and the transferor account of the offline resource transfer transaction, the executing the offline resource transfer transaction to transfer the resource corresponding to the resource transfer quantity from the transferor account to the receiver account includes:

subtracting the resource transfer quantity from a maintained initial resource quantity of the transferor account on each node and adding the resource transfer quantity to a maintained initial resource quantity of the receiver account of each node.

11. The non-transitory computer-readable medium according to claim 9, wherein the first plurality of execution environments in the transferor terminal include one or more of a rich execution environment, a trusted execution environment, and an execution element based on a secure element.

12. The non-transitory computer-readable medium according to claim 9, wherein the short-range wireless communication includes one or more of an NFC communication, a Bluetooth communication, a WiFi communication, or a code scanning communication.

13. The non-transitory computer-readable medium according to claim 9, wherein the consensus mechanism includes a RAFT consensus mechanism.

14. The non-transitory computer-readable medium according to claim 9, wherein the transferor account and the receiver account each is one of an account on an online blockchain network, or an offline account on the offline blockchain network corresponding to an account on an online blockchain network.

15. The non-transitory computer-readable medium according to claim 14, further comprising:

in response to the transferor terminal being in an online state, performing data synchronization with nodes in an online blockchain network; and updating resource quantities held by accounts corresponding to the receiver account and the transferor account and maintained by nodes in the online blockchain network based on resource quantities held by the receiver account and the transferor account of the offline resource transfer and maintained by blockchain nodes in the offline blockchain network.

16. The non-transitory computer-readable medium according to claim 9, wherein the resource includes an electronic currency, and the resource transfer includes electronic currency transfer.

17. A computing system comprising one or more storage devices and one or more processors, the one or more storage devices individually or collectively having executable instructions stored thereon, the executable instructions, when executed by the one or more processors, enabling the one or more processors to individually or collectively perform operations including:
- deploying an offline blockchain network that includes a first plurality of blockchain nodes and a second plurality of blockchain nodes, wherein:
- the first plurality of blockchain nodes are implemented in a first plurality of execution environments different from one another in a transferor terminal, the first plurality of execution environments having different data security levels,
- the second plurality of blockchain nodes are implemented in a second plurality of execution environments different from one another in a receiver terminal, the second plurality of execution environments having different data security levels,
- the first plurality of blockchain nodes configured to communicate with one another through a first internal communication channel of the transferor terminal,
- the second plurality of blockchain nodes configured to communicate with one another through a second internal communication channel of the receiver terminal,
- the first plurality of blockchain nodes sharing a first security key that is stored in a first blockchain node of the first plurality of blockchain nodes, in a first execution environment of the first plurality of execution environments, having a highest data security level among the first plurality of execution environments,
- the second plurality of blockchain nodes sharing a second security key that is stored in a first blockchain node of the second plurality of blockchain nodes, in a first execution environment of the second plurality of execution environments, having a highest data security level among the second plurality of execution environments,
- a second blockchain node of the first plurality of blockchain nodes, in a second execution environment of the first plurality of execution environments, is designated for communication with a second blockchain node of the second plurality of blockchain nodes,
- the second blockchain node of the second plurality of blockchain nodes, in a second execution environment of the second plurality of execution environments, is designated for communication with the second blockchain node of the first plurality of blockchain nodes,
- each blockchain node of the first plurality of blockchain nodes and the second plurality of blockchain nodes are configured to perform consensus verification on a resource transfer transaction;
- receiving, from a user of the transferor terminal, a request for an offline resource transfer transaction, the request including identification information of a transferor account, identification information of a receiver account, and a resource transfer quantity;
- receiving, the first security key from the first blockchain node of the first plurality of blockchain nodes through the first internal communication channel;
- constructing, the offline resource transfer transaction based on the received request, the constructing including securing the offline resource transfer transaction using the first security key;
- broadcasting, the offline resource transfer transaction to blockchain nodes of the first plurality of blockchain nodes through the first internal communication channel;
- sending, the offline resource transfer transaction to the second blockchain node of the second plurality of blockchain nodes, through a short-range wireless communication between the transferor terminal and the receiver terminal;
- broadcasting, the offline resource transfer transaction to blockchain nodes of the second plurality of blockchain nodes through the second internal communication channel;
- performing consensus on the offline resource transfer transaction between the first plurality of blockchain nodes and the second plurality of blockchain nodes based on a consensus mechanism of the offline blockchain network;
- executing the offline resource transfer transaction to transfer a resource corresponding to the resource transfer quantity from the transferor account to the receiver account.

* * * * *